(12) United States Patent
Geoffroy et al.

(10) Patent No.: US 8,016,464 B2
(45) Date of Patent: Sep. 13, 2011

(54) MULTIFUNCTIONAL INTERNAL LIGHTING DEVICE FOR A MOTOR VEHICLE

(75) Inventors: Eric Geoffroy, Mazamet (FR); Jérôme Monnot, Pont de l'Arn (FR); Michel Andrieu, Pont de l'Arn (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/755,109

(22) Filed: May 30, 2007

(65) Prior Publication Data
US 2007/0279926 A1   Dec. 6, 2007

(30) Foreign Application Priority Data

Jun. 2, 2006 (FR) .................................... 06 04965

(51) Int. Cl.
*B60Q 1/26* (2006.01)
(52) U.S. Cl. ........................ 362/489; 362/227
(58) Field of Classification Search .................. 362/613, 362/555, 479, 487–490, 251, 227, 228, 296, 362/249
See application file for complete search history.

(56) References Cited

U.S. PATENT DOCUMENTS

| | | | | |
|---|---|---|---|---|
| 5,325,271 | A * | 6/1994 | Hutchisson | 362/555 |
| 6,013,956 | A * | 1/2000 | Anderson, Jr. | 307/10.1 |
| 6,179,453 | B1 * | 1/2001 | McMahon | 362/490 |
| 6,533,445 | B1 * | 3/2003 | Rogers | 362/540 |
| 6,536,928 | B1 * | 3/2003 | Hein et al. | 362/464 |
| 6,629,716 | B2 | 10/2003 | Shibata et al. | |
| 6,679,621 | B2 | 1/2004 | West et al. | |
| 6,851,841 | B2 | 2/2005 | Sugihara et al. | |
| 7,036,965 | B2 | 5/2006 | Dalton, Jr. et al. | |
| 7,063,447 | B2 * | 6/2006 | Andrieu et al. | 362/488 |
| 2003/0001406 | A1 | 1/2003 | Shibata et al. | |
| 2003/0053317 | A1 | 3/2003 | Mertens | |
| 2003/0133307 | A1 | 7/2003 | Sugihara et al. | |
| 2003/0209531 | A1 | 11/2003 | Mattis | |
| 2003/0235050 | A1 | 12/2003 | West et al. | |
| 2004/0105279 | A1 * | 6/2004 | Liu et al. | 362/555 |
| 2004/0208013 | A1 | 10/2004 | Dalton, Jr. et al. | |
| 2005/0128761 | A1 * | 6/2005 | Wu | 362/498 |
| 2005/0219855 | A1 | 10/2005 | Iwai | |
| 2005/0231334 | A1 | 10/2005 | Stephens et al. | |
| 2006/0187670 | A1 | 8/2006 | Dalton, Jr. et al. | |

FOREIGN PATENT DOCUMENTS

| | | |
|---|---|---|
| EP | 1293380 | 3/2003 |
| EP | 1376708 | 1/2004 |
| EP | 1431158 | 6/2004 |
| EP | 1493621 | 1/2005 |
| EP | 1582405 | 10/2005 |
| FR | 2720039 | 11/1995 |
| JP | 2003127769 | 5/2003 |

* cited by examiner

*Primary Examiner* — Julie A Shallenberger
(74) *Attorney, Agent, or Firm* — Jacox, Meckstroth & Jenkins

(57) ABSTRACT

The present invention relates to a multifunctional internal lighting device for a motor vehicle. A single internal lighting device comprises various LED-type light sources which are capable of performing at least one first internal lighting function and a second internal lighting function. The various LEDs are distributed into at least two separate sets, a first set being dedicated to the performance of the first internal lighting function and a second set being dedicated to the performance of a second internal lighting function. In particular, it is proposed to use axial emission LEDs or through-emission LEDs and lateral emission LEDs to perform the first function and the second function respectively.

9 Claims, 3 Drawing Sheets

MULTIFUNCTIONAL INTERNAL LIGHTING DEVICE FOR A MOTOR VEHICLE

BACKGROUND OF THE INVENTION

1. Field of the Invention

The present invention relates to a lighting device, using light-emitting diodes, intended to be used inside motor vehicles.

2. Description of the Related Art

The field of the invention is, in general terms, that of lighting and signalling applied to motor vehicles. Within this field, various types of devices are known using light-emitting diodes, or LEDs, including basically the following devices:

- lighting devices located at the rear of the vehicle with, in particular, reversing lights;
- signalling devices located at the front (or on the side) of the vehicle with, in particular, direction indicators, repeat flash lights and DRLs (daytime running lights);
- signalling devices located at the rear of the vehicle with, in particular, fog lights, rear lights, direction indicators and stop lights, "upper stop" lights;
- internal lighting devices with, in particular, the main roof lamps (front, central, rear), or cigarette lighter illuminating modules; raised stop light-type rear lights, usually arranged in a central upper portion of the central rear windscreen, also belong to the category of internal lighting devices;
- internal or external lighting devices contributing to style, with for example style lines illuminated on the mudguards of the vehicle or on the dashboard, the door trimmings or else lighting of the body roof.

In the past, for all of these devices, use has traditionally been made of conventional lamp-type light sources or optionally of halogen lamps. However, over recent years, motor vehicle equipment manufacturers have proposed the use of LEDs, in particular for signalling lights. Light-emitting diodes have a certain number of advantages:

- firstly, it has long been known that diodes of this type do not radiate omnidirectionally but rather radiate within a half-space remote from a substrate supporting the PN junction of the diode in question; thus, by using more directional radiation than the halogen, or discharge, lamps of the prior art, less power is lost than with discharge or halogen lamps;
- then, these diodes were gradually improved in terms of radiation intensity; they can now radiate a flux of approximately 100 lumens. Moreover, the manufactured diodes have long emitted radiation in the red range, but now also in the white range, thus broadening the field of their conceivable uses. The amount of heat that they release is relatively low, and a certain number of constraints, associated with the dissipation of heat in the headlamp devices of the prior art, have disappeared;
- finally, diodes consume less power, even at the same radiation intensity, than discharge lamps or halogen lamps; they have a low overall size and their particular shape provides new possibilities for production and arrangement on complex surfaces for which they are intended.

Generally, light-emitting diodes are arranged on a substrate-type support (the best-known ones within the motor vehicle field being the SMI, FR4, CEM1, etc. substrates) which is, according to a general definition, a material intended to receive the imprint of an electronic circuit, and/or the various components forming this circuit, all of this forming a PCB (printed circuit board). A distinction can now be drawn, in particular, between three types of diodes; what are known as axial emission diodes, which emit a light beam in a main direction substantially perpendicular to the plane of the PCB supporting them, lateral emission diodes, which emit a light beam in a direction parallel to the PCB supporting them, and through-emission diodes, known as reverse gullwing diodes, which emit light through the PCB.

The present invention relates specifically to internal lighting devices. In the prior art, each internal lighting function, and more specifically each internal lighting function using light-emitting diodes, is performed using a specific lighting device dedicated exclusively to this function. Most of the functions in question correspond to a specific situation of life on board, such as reception, driving or else rest. The fact that there is a specific lighting device entails considerable costs in the performance of the internal lighting functions.

A general problem that the invention seeks to solve is thus a problem of reducing costs in the performance of the various internal lighting functions.

SUMMARY OF THE INVENTION

In order to solve this problem, the invention proposes to combine within a single internal lighting device various LED-type light sources which are capable of performing at least one first internal lighting function and a second internal lighting function. For this purpose, the various LEDs are distributed into at least two separate sets, a first set being dedicated to the performance of the first internal lighting function and a second set being dedicated to the performance of a second internal lighting function. Advantageously, it is proposed to use axial emission or through-emission LEDs and lateral emission LEDs to perform the first function and the second function respectively.

The basic object of the invention is to propose a solution, in particular, for reducing the costs for manufacturing the lighting devices present inside motor vehicles, basically by combining various internal lighting functions in a single lighting device.

The invention therefore basically relates to a lighting device for a motor vehicle, comprising in particular a plurality of light-emitting diode-type light sources, with at least one first set of light-emitting diodes and a second set of light-emitting diodes, characterized in that the plurality of light sources is arranged within a single internal lighting module, the first set of light-emitting diodes performing a first lighting function, the second set of light-emitting diodes performing a second lighting function.

In addition to the main features which have just been referred to in the preceding paragraph, the device according to the invention can have one or more complementary features from among the following:

- the first set of light-emitting diodes consists of axial emission or through-emission diodes, and the second set of light-emitting diodes consists of lateral emission diodes;
- wherein each light-emitting diode of first set of light-emitting diodes emits directly in the direction of the light beam of the first lighting function, and wherein each light-emitting diode of second set of light-emitting diodes emits directly in the direction of the light beam of the second lighting function;
- the internal lighting module comprises a single printed circuit board on which the first set of light-emitting diodes and the second set of light-emitting diodes are arranged;
- the first set of light-emitting diodes emits an overall light beam in a first favored direction, and the second set of light-emitting diodes emits an overall light beam in a second favored direction differing from the first favoured direction;

the light-emitting diodes of the first set of light-emitting diodes emit a light beam of a first intensity and the light-emitting diodes of the second set of light-emitting diodes emit a light beam of a second intensity lower than the first intensity;

the light-emitting diodes of the first set of light-emitting diodes emit a light beam of a first color and the light-emitting diodes of the second set of light-emitting diodes emit a light beam of a second color differing from the first color;

the internal lighting module comprises a single diffusion screen through which the light beams from the plurality of light sources are diffused;

the lighting module comprises a diffusion surface split by a blocking-off part into at least one first part and a second part, the first part diffusing light beams performing the first function, the second part diffusing light beams performing the second function;

the first function corresponds to a passenger compartment lighting function on stopping and the second function corresponds to a roof lighting function;

the first function corresponds to a passenger compartment lighting function during driving and the second function corresponds to a roof lighting function;

the first function corresponds to a lighting function of a cigarette lighter illuminating ring and the second function corresponds to an ashtray lighting function;

the plurality of light sources of the lighting device is arranged on a single printed circuit board comprising a first and a second contact tab, the first contact tab being intended to be in contact with the body of a cigarette lighter, body of the cigarette lighter thus corresponding to a reference potential, and the second tab being intended to be in contact with the connector of the cigarette lighter, thus allowing an electrical voltage to be applied to illuminate the plurality of light sources;

the first function corresponds to a passenger compartment lighting function during driving and the second function corresponds to a raised internal stop light function;

the first function and the second function are activated simultaneously;

the first function and the second function are activated in alternation.

The present invention also relates to a motor vehicle equipped with a lighting device having the main features and optionally one or more of the complementary features which have just been referred to, the lighting device being, for example, positioned either in a central portion of the roof of the passenger compartment of the vehicle or at least on one side of the passenger compartment of the vehicle.

The invention and its various applications will be better understood on reading the following description and on examining the accompanying figures. The figures are provided merely by way of example and do not in any way restrict the scope of the invention. In the drawings:

DESCRIPTION OF THE PREFERRED EMBODIMENTS

Figure 1A:
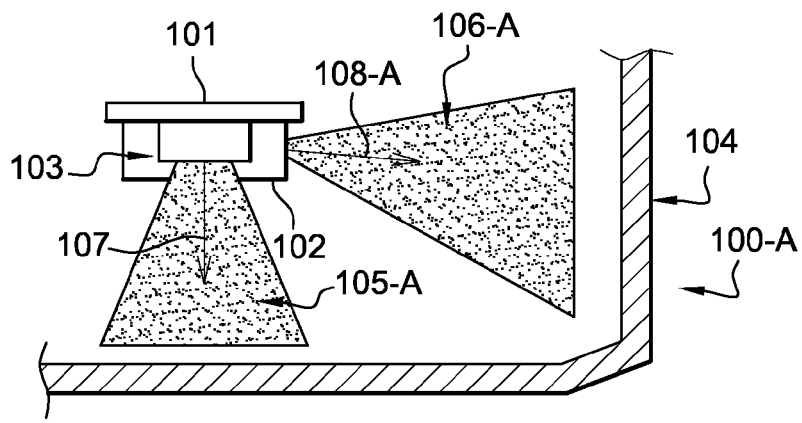
FIG. 1A is a first cross section of a first embodiment of an internal lighting device according to the invention.

The various elements appearing in several figures will, unless otherwise indicated, retain the same reference numeral.

Figure 1B:
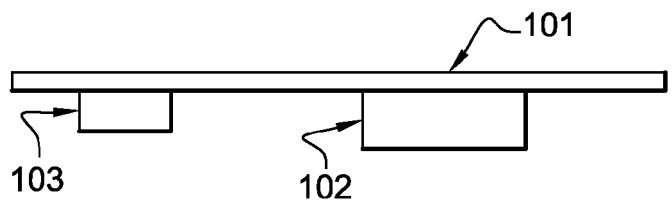
FIG. 1B is a second cross section of an element of the first embodiment of the internal lighting device.

FIGS. 1A and 1B show, in cross section and from the side, a first embodiment of an internal lighting device 100-A according to the invention. The internal lighting device 100-A comprises, in particular, a first LED 102 and a second LED 103 placed on a single printed circuit board 101, also referred to as the support or as the surface of the PCB. A diffusion screen 104 is shown; on the one hand, it protects the first and second LEDs 102 and 103 and also their single support 101; on the other hand, it also diffuses the light beams outside of the first internal lighting device 100-A.

In the illustrated example, the second LED 103 is an axial emission LED: the maximum intensity of a light beam 105-A which it produces is observed in a first direction 107, substantially perpendicular to the plane defined by the surface of the PCB 101; the first direction 107 corresponds to the main direction of emission of the second LED 103 through the diffusion screen 104. The first LED 102 is a lateral emission LED: the maximum intensity of a light beam 106-A which it produces is observed in a second direction 108-A, directed toward the right, having a relatively low angle, about twenty degrees, relative to the plane defined by the surface of the PCB 101. The second direction 108-A corresponds to the main direction of emission of the first LED 102 through the diffusion screen 104. In practice, use is made of a plurality of second LEDs 103 and a plurality of first LEDs 102, forming a first set of LEDs and a second set of LEDs respectively, to produce the light beam 105-A and 106-A respectively. For example, eight first LEDs 102 and eight second LEDs 103 are arranged on a single printed circuit board. The fact that all of the LEDs are arranged on a single printed circuit board allows space to be saved and the costs for manufacturing the lighting device in question to be reduced.

Figure 3:
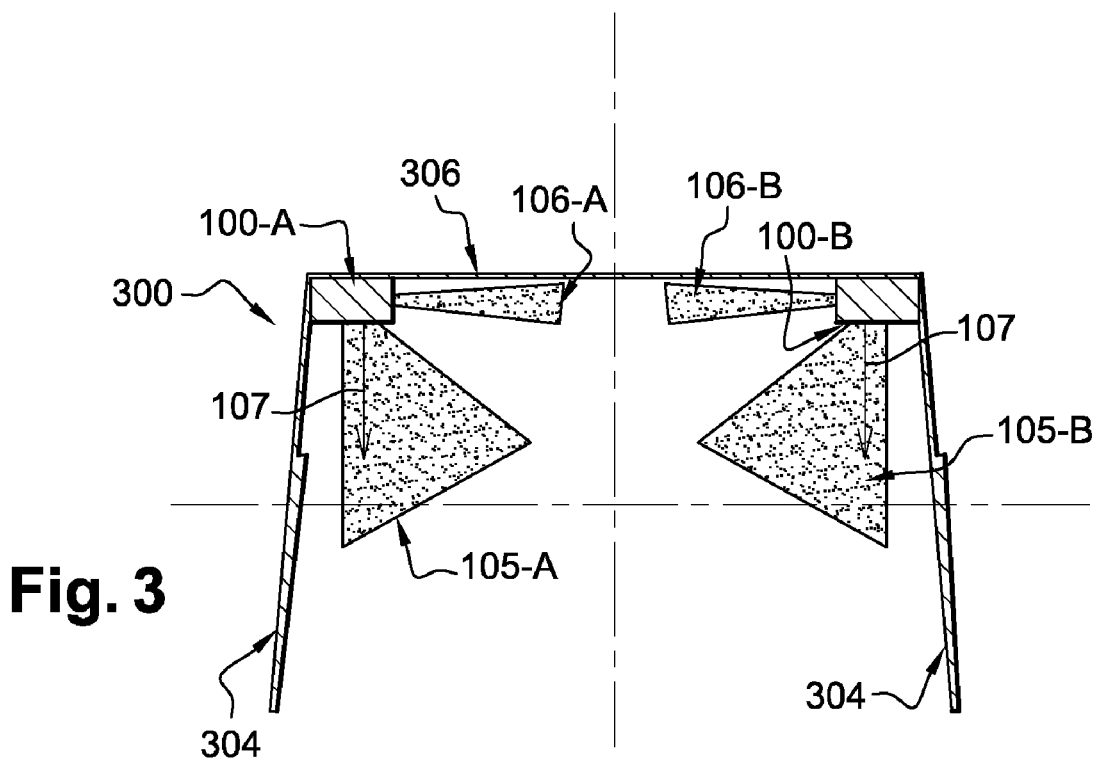
FIG. 3 is a cross section of a motor vehicle passenger compartment, equipped with the first embodiment of the internal lighting device according to the invention, positioned laterally either side of the roof of passenger compartment.

FIG. 3 is a cross section of a motor vehicle passenger compartment 300—the section plane being perpendicular to the plane defined by doors 304 of vehicle and to the roof 306 of the motor vehicle passenger compartment—equipped with the first internal lighting device 100-A and with a second lighting device 100-B according to the invention, symmetrical to the first internal lighting device 100-A. The first internal lighting device 100-A and the second internal lighting device 100-B are arranged laterally in the motor vehicle passenger compartment 300 by being placed in the region of the roof 306 in the region of a junction zone between the doors present on a single side of the motor vehicle passenger compartment.

The sole difference between the first internal lighting device 100-A and the second internal lighting device 100-B is that the first internal lighting device 100-A is characterized by a second lighting direction oriented, looking at the vehicle front on, toward the right, the direction in which a light beam 106-A is emitted, whereas the second lighting device 100-B is characterized by a second lighting direction oriented toward the left, the direction in which a light beam 106-B is emitted. The device 105-B also produces a light beam 105-B in the first direction 107.

The first and second lighting devices 100-A and 100-B are thus capable of performing two internal lighting functions: the first function is performed by the axial emission LEDs 103; it consists in this case in a reception lighting, of considerable intensity, intended for example for reception when the driver enters his vehicle or when he stops the engine. White-colored diodes are used in this case. The second function is performed by the lateral emission LEDs 102; it consists in this case in a lighting of the roof, of low intensity, intended for example to be used when the driver is driving and passengers wish to have low ambient lighting. Red-colored diodes are used in this case.

In one embodiment according to the invention, the axial emission LEDs 103 can be divided into two separate sub-sets. When a first sub-set is activated, it performs an ambient lighting function, or passenger compartment lighting function during driving, which is white in color and of low intensity; the second sub-set can then be activated, in addition to the activation of the first sub-set, to perform the reception lighting function, which is still white in color but of greater intensity.

In a particular example of the invention, the printed circuit board is connected to a microcontroller by at least three wires; a first wire consists of an earth wire. A second wire, allowing a voltage of 13 volts to be applied, controls the activation of the first set of LEDs, whereas a third wire, also allowing a voltage of 13 volts to be applied, controls the activation of the second set of LEDs. The various functions can thus be controlled independently. They can be activated simultaneously or separately.

Figure 2A:
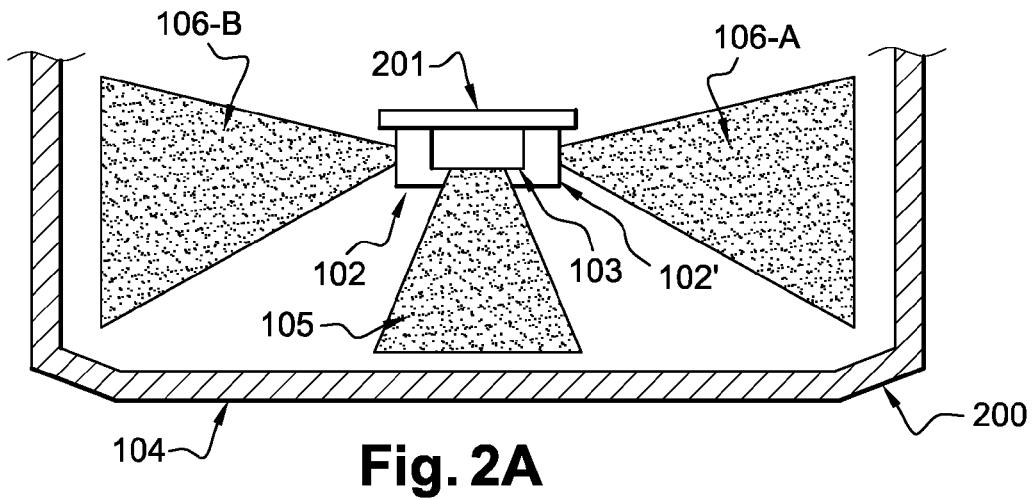
FIG. 2A is first cross section of a second embodiment of an internal lighting device according to the invention.
Figure 2B:
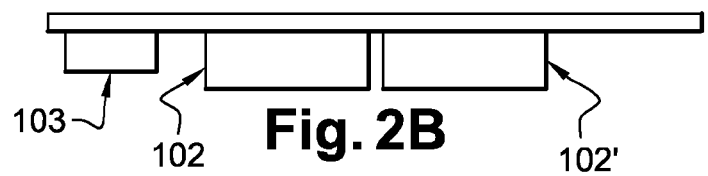
FIG. 2B is a second cross section of an element of the second embodiment of the internal lighting device.

FIGS. 2A and 2B show a second embodiment 200 of the internal lighting device according to the invention. The difference between the second example and the first example 100-A described with reference to FIGS. 1A and 1B resides in the fact that the number of lateral emission LEDs is doubled: now, a PCB 201 supports not only the first and second LEDs 102 and 103 but also a second set of lateral emission LEDs 102', the main direction of emission of which opposes the main direction of emission of the first set of lateral emission LEDs 102. The internal lighting device 200 is thus capable of producing, on its own, the first beam 106-A, a second beam 105 and the third beam 106-B. In a particular embodiment, the first beam and the third beam are illuminated simultaneously, performing a single lighting function corresponding to a low-intensity lighting of the roof.

Figure 4:
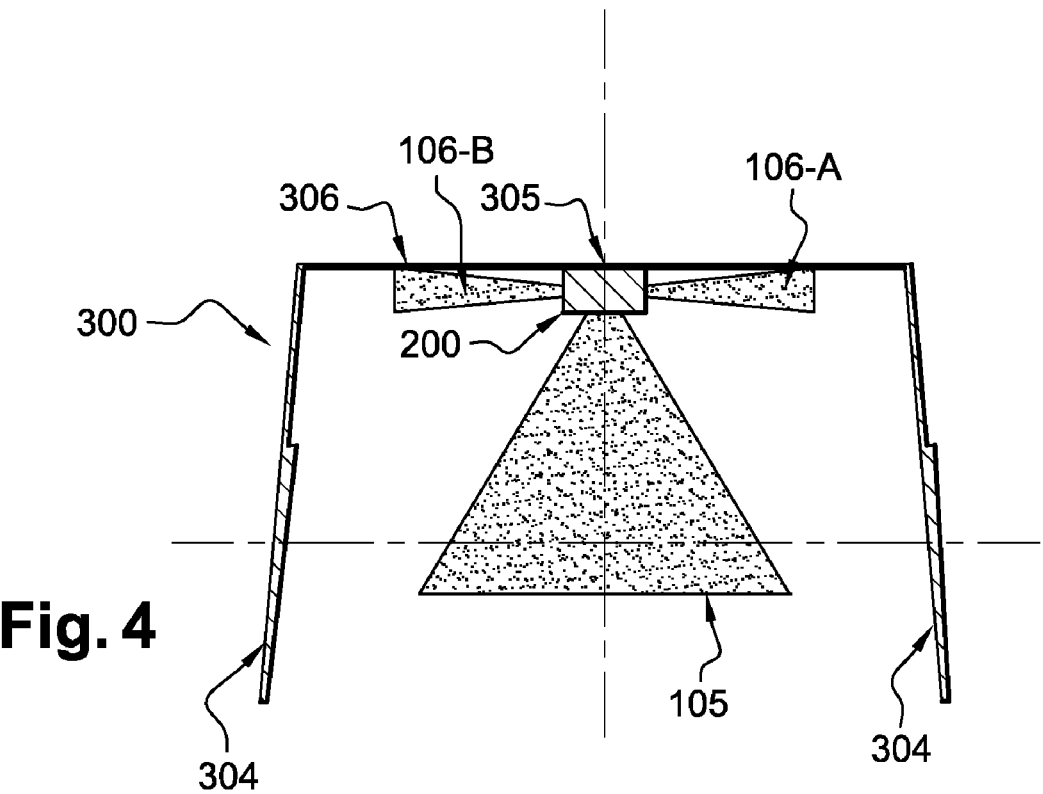
FIG. 4 is cross section of the motor vehicle, equipped with the second embodiment of the internal lighting device according to the invention, positioned in immediate proximity to the center of the roof of the passenger compartment of the vehicle.

The internal lighting device 200 is advantageously placed at the center 305 of the roof 306 of the passenger compartment 300, as shown in FIG. 4. The axial emission LEDs 103 then produce a light beam 105 performing, on its own, the high-intensity reception light function.

Figure 5:
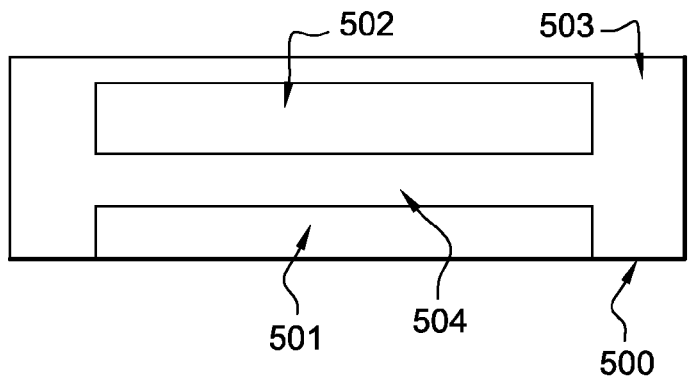
FIG. 5 is a schematic illustration of a third embodiment of the internal lighting device according to the invention.

FIG. 5 is a schematic illustration of a third embodiment 500 of the internal lighting device having, in particular, a first "upper stop" or "raised stop light"-type function also referred to as a CHMSL (central high mounted stop lamp) function, which is placed on the upper portion of the rear windscreen of the vehicle. The first function is performed through a first diffusion zone 502 of the internal lighting device 500. It is performed by means of lateral emission LEDs emitting in the red range, the main direction of emission of which is oriented toward the outside of the vehicle. However, as the internal lighting device 500 is arranged inside the passenger compartment, it therefore belongs to the category of internal lighting devices.

The internal lighting device 500 is capable of performing a second lighting function, for example of the reception lighting type. Axial emission LEDs are used for this function. For this purpose, it comprises a second diffusion zone 501, the main direction of emission of which is oriented downward when the internal lighting device 500 is placed in the passenger compartment. In this example, the beam is of high intensity and white in color.

The first diffusion zone 502 and the second diffusion zone are held by the structure of the internal lighting device 500 made, for example, of a metallic or plastics material. The structure can, in particular, comprise a blocking-off part 504 separating the two diffusion zones. Although they are physically separated, the two diffusion zones 501 and 502 can be produced from a single diffusion screen placed within the structure 503 of the internal lighting device 500.

Figure 6:
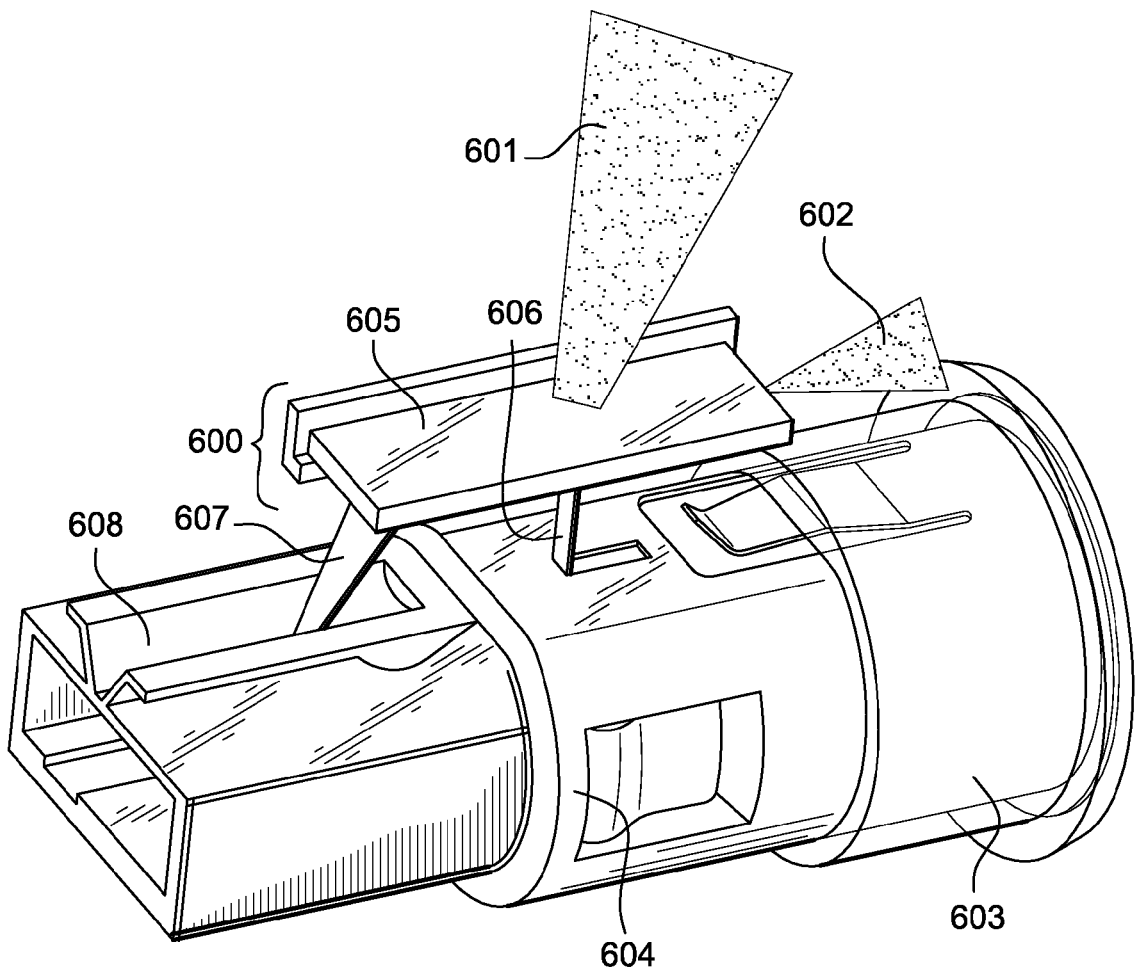
FIG. 6 is a schematic illustration of a fourth embodiment of the lighting device according to the invention, adapted to a cigarette lighter illuminating ring and an ashtray.

FIG. 6 shows a further embodiment of the lighting device 600 according to the invention. This example shows the lighting device 600 placed in the use condition. The lighting device 600 consists of a first set of axial emission diodes producing a first light beam 601, intended to illuminate an ashtray, and a second set of lateral emission diodes producing a second light beam 602, intended to illuminate a ring 603 of a cigarette lighter 604. All of the LEDs are arranged on a single PCB 605. In certain embodiments of this example, the first beam 601 is transmitted toward the ashtray by means of at least one light guide allowing any accessory located facing light guide to be illuminated.

In the illustrated example, the PCB comprises a first contact tab 606 in contact with the body of the cigarette lighter, body of the cigarette lighter corresponding to a reference potential of the vehicle, typically 0 volt. The PCB further comprises a second contact tab 607 which enters into contact with a connector tab of the cigarette lighter; there is thus obtained, by this means, a voltage having a value of 12 volts allowing the various sets of LEDs to be illuminated. In the illustrated embodiment, the connector tab is a three-point connector tab.

Generally, the invention extends to all internal lighting devices using LEDs and performing at least two separate lighting functions. In this regard, it also relates to devices for illuminating cigarette lighter rings which also perform the illuminating of the ashtray placed in proximity thereto.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lighting device for a motor vehicle, comprising:
   a plurality of light-emitting diode light sources, said plurality of light-emitting diode light sources comprising at least one first set of light-emitting diodes and at least one second set of light-emitting diodes; wherein each of said plurality of light-emitting diode light sources is mounted on a printed circuit board within a single internal lighting module, said at least one first set of light-emitting diodes directing light in a direction generally perpendicular to a plane in which said at least one first set of light-emitting diodes lies to perform a first lighting function, said at least one second set of light-emitting diodes directing light in a direction generally parallel to said plane in which said at least one first set of light-emitting diodes lies to perform a second lighting function;

wherein said second lighting function corresponds to a lighting function of a cigarette lighter illuminating ring and said first lighting function corresponds to an ashtray lighting function;

wherein said first set of light emitting diodes are axial emission diodes and said second set of light emitting diodes are lateral emission diodes; and wherein said plurality of light-emitting diode light sources of said lighting device is arranged on said single circuit board comprising a first contact tab and a second contact tab, said first contact tab being coupled to and in direct contact with a body of a cigarette lighter, said body of said cigarette lighter thus corresponding to a reference potential, and said second contact tab in contact with a connector of said cigarette lighter, thus allowing an electrical voltage to be applied to illuminate said plurality of light-emitting diode light sources so that said cigarette lighter illuminating ring and an ashtray become illuminated.

2. The lighting device according to claim 1, wherein each light-emitting diode of said at least one first set of light-emitting diode emits directly in the direction of the light beam of said first lighting function, and wherein each light-emitting diode of said at least one second set of light-emitting diode emits directly in the direction of said light beam of said second lighting function.

3. The lighting device according to claim 1, wherein said at least one first set of light-emitting diodes emits an overall light beam in a first favored direction, and in that said at least one second set of light-emitting diodes emits an overall light beam in a second favored direction differing from said first favored direction.

4. The lighting device according to claim 1, wherein each of said plurality of light-emitting diode light sources is mounted on said single circuit board and said single internal lighting module comprises a diffusion surface split by a blocking-off part into at least one first part and a second part, said at least one first part diffusing light beams performing said first lighting function, said second part diffusing light beams performing said second lighting function.

5. The lighting device according to claim 1, wherein said at least one first set of light emitting diodes and said at least one second set of light emitting diodes are activated simultaneously.

6. The lighting device according to claim 1, wherein said at least one first set of light emitting diodes and said second set of light emitting diodes are activated in alternation.

7. A motor vehicle equipped with at least one lighting device according to claim 1, said at least one lighting device being arranged in a central portion of the roof of the passenger compartment of the vehicle.

8. A motor vehicle equipped with at least one lighting device according to claim 1, said at least one lighting device being arranged at least on one side of the passenger compartment of the vehicle.

9. The lighting device according to claim 1 wherein said at least one first set of light-emitting diodes comprise axial emission diodes or through-emission diodes and said at least one second set of light-emitting diodes comprising lateral emission diodes.

* * * * *